(12) United States Patent
Takai et al.

(10) Patent No.: US 10,489,428 B2
(45) Date of Patent: Nov. 26, 2019

(54) EXISTING SYSTEM PROCESSING SPECIFICATION EXTRACTOR

(71) Applicant: Hitachi, Ltd., Tokyo (JP)

(72) Inventors: Yasunari Takai, Tokyo (JP); Katsumi Kawai, Tokyo (JP); Shuhei Nojiri, Tokyo (JP); Ryota Mibe, Tokyo (JP); Kiyoshi Yamaguchi, Tokyo (JP)

(73) Assignee: Hitachi, Ltd., Tokyo (JP)

( * ) Notice: Subject to any disclaimer, the term of this patent is extended or adjusted under 35 U.S.C. 154(b) by 367 days.

(21) Appl. No.: 15/320,992

(22) PCT Filed: Aug. 1, 2016

(86) PCT No.: PCT/JP2016/072560
§ 371 (c)(1),
(2) Date: Dec. 21, 2016

(87) PCT Pub. No.: WO2017/047257
PCT Pub. Date: Mar. 23, 2017

(65) Prior Publication Data
US 2017/0270185 A1 Sep. 21, 2017

(30) Foreign Application Priority Data
Sep. 17, 2015 (JP) .................... 2015-183554

(51) Int. Cl.
*G06F 16/28* (2019.01)
*G06F 16/23* (2019.01)

(52) U.S. Cl.
CPC ........ *G06F 16/287* (2019.01); *G06F 16/2358* (2019.01)

(58) Field of Classification Search
CPC ............................ G06F 16/287; G06F 16/2358

USPC ......................................................... 707/740
See application file for complete search history.

(56) References Cited

U.S. PATENT DOCUMENTS 5,862,382 A * 1/1999 Kataoka ................... G06F 8/75
717/125

FOREIGN PATENT DOCUMENTS

JP 09-026897 A 1/1997

OTHER PUBLICATIONS

International Search Report of PCT/JP2016/072560 dated Oct. 11, 2016.

* cited by examiner

*Primary Examiner* — Joshua Bullock
(74) *Attorney, Agent, or Firm* — Mattingly & Malur, PC

(57) ABSTRACT

The present invention has an object to analyze, regarding an existing system without a source code, the relationship between input items and internal system processing with respect to output items and present the analysis results to a user. An existing system processing specification extractor is an apparatus for making an existing system operate and analogizing input items of the existing system and internal system processing patterns without performing analysis of implementation and includes: an output data change information acquisition unit that classifies changes of output data associated with input to the existing system on the basis of types of changes of each output element; and an internal system processing specifying unit that combines the classifications obtained by making different input to the existing system and specifies a type of processing based on a usage pattern of an input item value.

26 Claims, 14 Drawing Sheets

FIG.5

| # | Target | Association Method | # | Internal System Processing | Conditions |
|---|---|---|---|---|---|
| I | Set of output data change pattern information with the same content | Associate internal system processing on the basis of "table indicative of procedures for associating output data change patterns with internal system processing and their correspondence relationship" | 1 | Branching Processing | When output data change patterns change |
| II | Set of matching output data change pattern information at least except initial output element | | 2 | Output Element Selection Processing | When both output data change patterns are "Output Element Change" and output items of changed output elements are different |
| III | Set of matching output data change pattern information at least except initial output element or changing value | | | | When #1 is not applicable and both output data change patterns are "Output Element Deletion" and different output elements in the same output item are deleted |
| IV | Set of matching output data change pattern information at least except initial output element, or changing output element or value | | 3 | Output Value Determination Processing | When #1 is not applicable and both output data change patterns are "Output Element Change" and different output elements in the same output item are changed |
| V | Set of matching output data change pattern information at least except initial output element, or changing output item, output element, or value | | 4 | Output Operation Irrelevance Processing | When #1 and #2 are not applicable and both output data change patterns are "Output Element Addition" and values of added output elements are different |
| | | | | | When #1 and #2 are not applicable and both output data change patterns are "Output Element Change" and values of changed output elements are different |
| | | | | | When #1 to #3 are not applicable |
| VI | Output data change pattern information whose combination cannot be found | — | 1 | Branching Processing | — |

FIG.10

Reference Output Data Change Pattern Information — 400

| Item Number | Input Item | Output Element | | | | | DB Data Change Pattern |
|---|---|---|---|---|---|---|---|
| 1 | Screen / Product Name | Output Item | Product Information Table | | | | Output Element Update |
| | | Initial Output Element | 1st Output Element | | | | |
| | | | ID | Name | Count | | |
| | | Initial Output Data | 0001 | Product A | 10 | | |
| | | Executed Output Data | 0001 | Product AA | 10 | | |
| | | Output Item | Product Information Table | | | | No Change |
| | | Initial Output Element | 2nd Output Element | | | | |
| | | | ID | Name | Count | | |
| | | Initial Output Data | 0002 | Product B | 20 | | |
| | | Executed Output Data | 0002 | Product B | 20 | | |

— 401 (top section), — 402 (bottom section)

Changed Output Data Change Pattern Information — 410

| Item Number | Input Item | Output Element | | | | | DB Data Change Pattern |
|---|---|---|---|---|---|---|---|
| 1 | Screen / Product Name | Output Item | Product Information Table | | | | Output Element Update |
| | | Initial Output Element | 1st Output Element | | | | |
| | | | ID | Name | Count | | |
| | | Initial Output Data | 0001 | Product A | 10 | | |
| | | Executed Output Data | 0001 | Product AB | 10 | | |
| | | Output Item | Product Information Table | | | | No Change |
| | | Initial Output Element | 2nd Output Element | | | | |
| | | | ID | Name | Count | | |
| | | Initial Output Data | 0002 | Product B | 20 | | |
| | | Executed Output Data | 0002 | Product B | 20 | | |

— 411 (top section), — 412 (bottom section)

FIG. 11

| Item Number | Input Item | | Change Item Number | Change | | | | | | | Internal System Processing |
|---|---|---|---|---|---|---|---|---|---|---|---|
| | Screen | Product Name | | Reference Change | Output Data Pattern Change | Output Item Change | | Output Element Change | Value Change | | Output Value Determination Processing |
| | | | | Changed or No Change | Output Data Change Pattern | Table | Column | | Executed Output Data | | |
| 1 | Product Name | | 1 | Reference | Output Element Change | Product Information | Name | Initial DB Output Element | Product AA | | |
| | | | | Change | Output Element Change | Product Information | Name | 1st Output Element | Product AB | | |
| | | | | Changed or No Change | No Change | No Change | | 1st Output Element | Changed | | |

| Output Item | Table Name | Product Information | | | | | | | | | | | |
|---|---|---|---|---|---|---|---|---|---|---|---|---|---|
| | Column Name | ID | | | | Name | | | | Count | | | |
| CRUD | | C | R | U | D | C | R | U | D | C | R | U | D |
| | | | | | | | | O | | | | O | |
| Input Item Name / Screen | ID | | | | | | | BS | | | | BS | |
| | Product Name | | | | | | | BO | | | | B | |
| | Quantity | | | | | | | B | | | | BO | |
| Input Item Name / DB / Product Information | ID | | | | | | | B | | | | B | |
| | Name | | | | | | | B | | | | B | |
| | Count | | | | | | | | | | | | |

[Outlines of Analysis Results]

| Output Item | Table Name | Product Information | | | | | | | | | | | |
|---|---|---|---|---|---|---|---|---|---|---|---|---|---|
| | Column Name | ID | | | | Name | | | | Count | | | |
| CRUD | | C | R | U | D | C | R | U | D | C | R | U | D |
| | | | | | | | | ○ | | | | ○ | |
| Input Item Name | Screen | ID | | | | | | BS | | | | BS | |
| | | Product Name | | | | | | BO | | | | B | |
| | | Quantity | | | | | | B | | | | BO | |
| | DB / Product Information | ID | | | | | | B | | | | B | |
| | | Name | | | | | | B | | | | B | |
| | | Count | | | | | | | | | | | |

[Details of Analysis]

1520 — Input List When Changed (1521)

| Item Number | Change Factor Input Item – Input Data | Other Input Items – Input Data | | Initial Output Data – Product Information | | |
|---|---|---|---|---|---|---|
| | ID | Product Name | Quantity | ID | Name | Count |
| #1-1 | 0001 | Product Name A | 10 | 0001 / 0002 | Product Name AA / Product Name B | 10 / 20 |
| #1-2 | 0001 | Product Name B | 10 | 0001 / 0002 | Product Name AB / Product Name A | 10 / 20 |
| #1-3 | 0001 | Product Name A | 20 | 0001 / 0002 | Product Name AA / Product Name B | 50 / 20 |
| #2-1 | 0002 | Product Name A | 10 | 0001 / 0002 | Product Name AA / Product Name B | 10 / 20 |
| #2-2 | 0002 | Product Name B | 10 | 0001 / 0002 | Product Name AB / Product Name A | 10 / 20 |
| #2-3 | 0002 | Product Name A | 20 | 0001 / 0002 | Product Name AA / Product Name B | 50 / 20 |
| #3-1 | 0003 | Product Name A | 10 | 0003 / 0002 | Product Name AA / Product Name B | 10 / 20 |
| #3-2 | 0003 | Product Name A | 20 | 0003 / 0002 | Product Name AA / Product Name B | 50 / 20 |
| #3-3 | 0003 | Product Name A | 20 | 0001 / 0003 | Product Name AA / Product Name B | 50 / 20 |
| #4-1 | 0004 | Product Name A | 10 | 0004 / 0002 | Product Name AA / Product Name B | 10 / 20 |
| #4-2 | 0004 | Product Name B | 10 | 0001 / 0004 | Product Name AB / Product Name A | 10 / 20 |
| #4-3 | 0004 | Product Name A | 20 | 0005 / 0004 | Product Name AA / Product Name B | 50 / 20 |

Input List When Unchanged (1522)

| Item Number | Change Factor Input Item – Input Data | Other Input Items – Input Data | | Initial Output Data – Product Information | | |
|---|---|---|---|---|---|---|
| | ID | Product Name | Quantity | ID | Name | Count |
| #1-1' | 0003 | Product Name A | 10 | 0001 / 0002 | Product Name AA / Product Name B | 10 / 20 |
| #1-2' | 0003 | Product Name B | 10 | 0001 / 0002 | Product Name AB / Product Name A | 10 / 20 |
| #1-3' | 0003 | Product Name A | 20 | 0001 / 0002 | Product Name AA / Product Name B | 50 / 20 |
| #2-1' | 0004 | Product Name A | 10 | 0001 / 0002 | Product Name AA / Product Name B | 10 / 20 |
| #2-2' | 0004 | Product Name B | 10 | 0001 / 0002 | Product Name AB / Product Name A | 10 / 20 |
| #2-3' | 0004 | Product Name A | 20 | 0001 / 0002 | Product Name AA / Product Name B | 50 / 20 |
| #3-1' | 0001 | Product Name A | 10 | 0003 / 0002 | Product Name AA / Product Name B | 10 / 20 |
| #3-2' | 0001 | Product Name A | 20 | 0003 / 0002 | Product Name AA / Product Name B | 50 / 20 |
| #3-3' | 0002 | Product Name A | 20 | 0001 / 0003 | Product Name AA / Product Name B | 50 / 20 |
| #4-1' | 0001 | Product Name A | 10 | 0004 / 0002 | Product Name AA / Product Name B | 10 / 20 |
| #4-2' | 0002 | Product Name B | 10 | 0001 / 0004 | Product Name AB / Product Name A | 10 / 20 |
| #4-3' | 0002 | Product Name A | 20 | 0005 / 0004 | Product Name AA / Product Name B | 50 / 20 |

Example of grouping analysis cases with the same input values except ID column of 1st output element

| # | Changed or No Change | Analysis Data | | | | | | | | 1600 |
|---|---|---|---|---|---|---|---|---|---|---|
| | | Initial Output Data | | | | | | Input Data | | |
| | | 1st Output Element | | | 2nd Output Element | | | | | |
| | | Product Information | | | Product Information | | | | | |
| | | ID | Name | Count | ID | Name | Count | ID | Product Name | Quantity |
| #1-1 | O | 0001 | Product Name A | 10 | 0001 | Product Name AA | 10 | 0002 | Product Name B | 20 |
| #2-1 | O | 0002 | Product Name A | 10 | 0001 | Product Name AA | 10 | 0002 | Product Name B | 20 |
| #1-1' | × | 0003 | Product Name A | 10 | 0001 | Product Name AA | 10 | 0002 | Product Name B | 20 |
| #3-1' | × | 0001 | Product Name A | 10 | 0003 | Product Name AA | 10 | 0002 | Product Name B | 20 |
| #3-1 | O | 0003 | Product Name A | 10 | 0003 | Product Name AA | 10 | 0002 | Product Name B | 20 |
| #4-1 | O | 0004 | Product Name A | 10 | 0004 | Product Name AA | 10 | 0002 | Product Name B | 20 |
| #1-3 | O | 0001 | Product Name A | 20 | 0001 | Product Name AA | 50 | 0002 | Product Name B | 20 |
| #2-3 | O | 0002 | Product Name A | 20 | 0001 | Product Name AA | 50 | 0002 | Product Name B | 20 |
| #3-3 | O | 0003 | Product Name A | 20 | 0001 | Product Name AA | 50 | 0003 | Product Name B | 20 |
| #1-3' | × | 0003 | Product Name A | 20 | 0001 | Product Name AA | 50 | 0002 | Product Name B | 20 |
| #3-2' | × | 0001 | Product Name A | 20 | 0003 | Product Name AA | 50 | 0002 | Product Name B | 20 |
| #4-3 | O | 0004 | Product Name A | 20 | 0005 | Product Name AA | 50 | 0004 | Product Name B | 20 |
| #1-2 | O | 0001 | Product Name B | 10 | 0001 | Product Name AB | 10 | 0002 | Product Name A | 20 |
| #2-2 | O | 0002 | Product Name B | 10 | 0001 | Product Name AB | 10 | 0002 | Product Name A | 20 |
| #1-2' | × | 0003 | Product Name B | 10 | 0001 | Product Name AB | 10 | 0002 | Product Name A | 20 |
| #4-2 | O | 0004 | Product Name B | 10 | 0001 | Product Name AB | 10 | 0002 | Product Name A | 20 |
| #2-1' | × | 0004 | Product Name A | 10 | 0001 | Product Name AA | 10 | 0002 | Product Name B | 20 |
| #4-1' | × | 0001 | Product Name A | 10 | 0004 | Product Name AA | 10 | 0002 | Product Name B | 20 |
| #3-3' | × | 0002 | Product Name A | 20 | 0001 | Product Name AA | 50 | 0003 | Product Name B | 20 |
| #2-3' | × | 0004 | Product Name A | 20 | 0001 | Product Name AA | 50 | 0002 | Product Name B | 20 |
| #3-2 | O | 0003 | Product Name A | 20 | 0003 | Product Name AA | 50 | 0002 | Product Name B | 20 |
| #4-3' | × | 0002 | Product Name A | 20 | 0005 | Product Name AA | 50 | 0004 | Product Name B | 20 |
| #4-2' | × | 0002 | Product Name B | 10 | 0001 | Product Name AB | 10 | 0004 | Product Name A | 20 |
| #2-2' | × | 0004 | Product Name B | 10 | 0001 | Product Name AB | 10 | 0002 | Product Name A | 20 |

Example of grouping analysis cases with the same input values except Name column of 1st output element

| # | Changed or No Change | Analysis Data | | | | | | | | 1610 |
|---|---|---|---|---|---|---|---|---|---|---|
| | | Initial Output Data | | | | | | Input Data | | |
| | | 1st Output Element | | | 2nd Output Element | | | | | |
| | | Product Information | | | Product Information | | | | | |
| | | ID | Name | Count | ID | Name | Count | ID | Product Name | Quantity |
| #1-1 | O | 0001 | Product Name A | 10 | 0001 | Product Name AA | 10 | 0002 | Product Name B | 20 |
| #1-2 | O | 0001 | Product Name B | 10 | 0001 | Product Name AB | 10 | 0002 | Product Name A | 20 |
| #3-1' | × | 0001 | Product Name A | 10 | 0003 | Product Name AA | 10 | 0002 | Product Name B | 20 |
| #4-1' | × | 0001 | Product Name A | 10 | 0004 | Product Name AA | 10 | 0002 | Product Name B | 20 |
| #1-3 | O | 0001 | Product Name A | 20 | 0001 | Product Name AA | 50 | 0002 | Product Name B | 20 |
| #3-2' | × | 0001 | Product Name A | 20 | 0003 | Product Name AA | 50 | 0002 | Product Name B | 20 |
| #2-1 | O | 0002 | Product Name A | 10 | 0001 | Product Name AA | 10 | 0002 | Product Name B | 20 |
| #2-2 | O | 0002 | Product Name B | 10 | 0001 | Product Name AB | 10 | 0002 | Product Name A | 20 |
| #4-2' | × | 0002 | Product Name B | 10 | 0001 | Product Name AB | 10 | 0004 | Product Name A | 20 |
| #2-3 | O | 0002 | Product Name A | 20 | 0001 | Product Name AA | 50 | 0002 | Product Name B | 20 |
| #3-3' | × | 0002 | Product Name A | 20 | 0001 | Product Name AA | 50 | 0003 | Product Name B | 20 |
| #4-3' | × | 0002 | Product Name A | 20 | 0005 | Product Name AA | 50 | 0004 | Product Name B | 20 |
| #1-1' | × | 0003 | Product Name A | 10 | 0001 | Product Name AA | 10 | 0002 | Product Name B | 20 |
| #1-2' | × | 0003 | Product Name B | 10 | 0001 | Product Name AB | 10 | 0002 | Product Name A | 20 |
| #3-1 | O | 0003 | Product Name A | 10 | 0003 | Product Name AA | 10 | 0002 | Product Name B | 20 |
| #3-3 | O | 0003 | Product Name A | 20 | 0001 | Product Name AA | 50 | 0003 | Product Name B | 20 |
| #1-3' | × | 0003 | Product Name A | 20 | 0001 | Product Name AA | 50 | 0002 | Product Name B | 20 |
| #3-2 | O | 0003 | Product Name A | 20 | 0003 | Product Name AA | 50 | 0002 | Product Name B | 20 |
| #4-2 | O | 0004 | Product Name B | 10 | 0001 | Product Name AB | 10 | 0004 | Product Name A | 20 |
| #2-1' | × | 0004 | Product Name A | 10 | 0001 | Product Name AA | 10 | 0002 | Product Name B | 20 |
| #2-2' | × | 0004 | Product Name B | 10 | 0001 | Product Name AB | 10 | 0002 | Product Name A | 20 |
| #4-1 | O | 0004 | Product Name A | 10 | 0004 | Product Name AA | 10 | 0002 | Product Name B | 20 |
| #2-3' | × | 0004 | Product Name A | 20 | 0001 | Product Name AA | 50 | 0002 | Product Name B | 20 |
| #4-3 | O | 0004 | Product Name A | 20 | 0005 | Product Name AA | 50 | 0004 | Product Name B | 20 |

EXISTING SYSTEM PROCESSING SPECIFICATION EXTRACTOR

TECHNICAL FIELD

The present invention relates to a technique to associate items input to a system regarding an existing information system with internal system processing regarding output items. Particularly, regarding such technique, the invention relates to a technique that recognizes specifications of the existing information system during so-called replacement development.

BACKGROUND ART

In recent years, existing information systems are developed by means of replacement. In this case, it is necessary to recognize, for example, specifications of the existing information systems, and programs of such system are being analyzed. There is Japanese Patent Application Laid-Open Publication No. 1997-26897 (PTL 1) as an example disclosing such technology. This publication describes a "program analysis apparatus for analyzing a source code of a computer program representing processing of data, the program analysis apparatus comprising: data information extraction means that extracts data information which is information indicating a structure of each piece of the data; and related information extraction means that extracts related information between the pieces of data with respect to a specified position of the source code on the basis of the source code and the data information (refer to claim 1 thereof).

CITATION LIST

Patent Literature

PTL 1: Japanese Patent Application Laid-Open Publication No. 1997-26897

SUMMARY OF THE INVENTION

Problems to be Solved by the Invention

PTL 1 describes a method for making it easier to understand the content of the processing and the content of the source code including input/output specifications by means of static analysis of the source code. However, since PTL 1 analyzes the source code, PTL 1 cannot be applied when there is no source code. Regarding the replacement development, the development is sometimes conducted without being unable to acquire the source code. Thus, in that case, the technology described in PTL 1 cannot be used. Therefore, it is an object of the present invention to extract the relationship between the input items of the relevant system and the internal processing of the system with respect to the output items and present it to a user.

Means to Solve the Problems

In order to solve the above-describe problems, the present invention is designed to execute different input for input items of an information system and associate its (internal) processing with the input items by using differences between these input and differences in changes of output data for the respective input. Under this circumstance, an example of the changes of the output data is DB data associated with the input and an example of the processing is processing for DB operation. In this case, "changes of the DB data" include "record addition," "record deletion," and "record update" and differences in the "changes of the DB data" include "changes of whether an SQL query exists or not," "changes of a column to be updated," "changes of a record to be updated/deleted," and "changes of a value of a record to be added/updated." In this example, the input items are associated with the "processing relating to the DB operation" on the basis of the relationship between the differences in the "changes of the DB data" and the "processing relating to the DB operation."

More specifically, the following aspect is also included in the present invention. Regarding changes of output data associated with input to an existing system, a type of processing based on a usage pattern of an input item value is specified by combining the following classifications obtained by giving different input to the existing system and an output data change information acquisition unit which classifies on the basis of types of changes on each output element.

Advantageous Effects of the Invention

According to the present invention, the relationship between the input items of the existing information system and the internal processing of the system with respect to the output items can be extracted even when there is no source code.

Problems, configurations, and advantageous effects other than those described above will be clarified by the description of embodiments below.

BRIEF DESCRIPTION OF DRAWINGS

FIG. 5 is a table indicative of procedures for associating output data change patterns with internal system processing and their correspondence relationship;

FIG. 10 is a diagram illustrating output data change pattern information 271 which is a classification result of change patterns of the output data according to an embodiment of the present invention;

FIG. 11 is a diagram illustrating internal system processing information 272 which is a result of specifying the internal system processing according to an embodiment of the present invention;

FIG. 12 is a diagram illustrating an example of output results when the internal system processing information 272 obtained by repeatedly analyzing the analysis target system 280 according to an embodiment of the present invention is collectively output;

FIG. 13 is a diagram illustrating an example of screen output for supporting understanding of association between the input items of the system according to an embodiment of the present invention and the internal system processing with respect to the output items; and FIG. 14 is a diagram illustrating an example of a method for classifying classification cases according to an embodiment of the present invention.

DESCRIPTION OF EMBODIMENTS

Embodiments will be explained below with reference to drawings.

Embodiment 1

In the present embodiment, an example of processing of an analysis device 100 will be explained.

Figure 1:
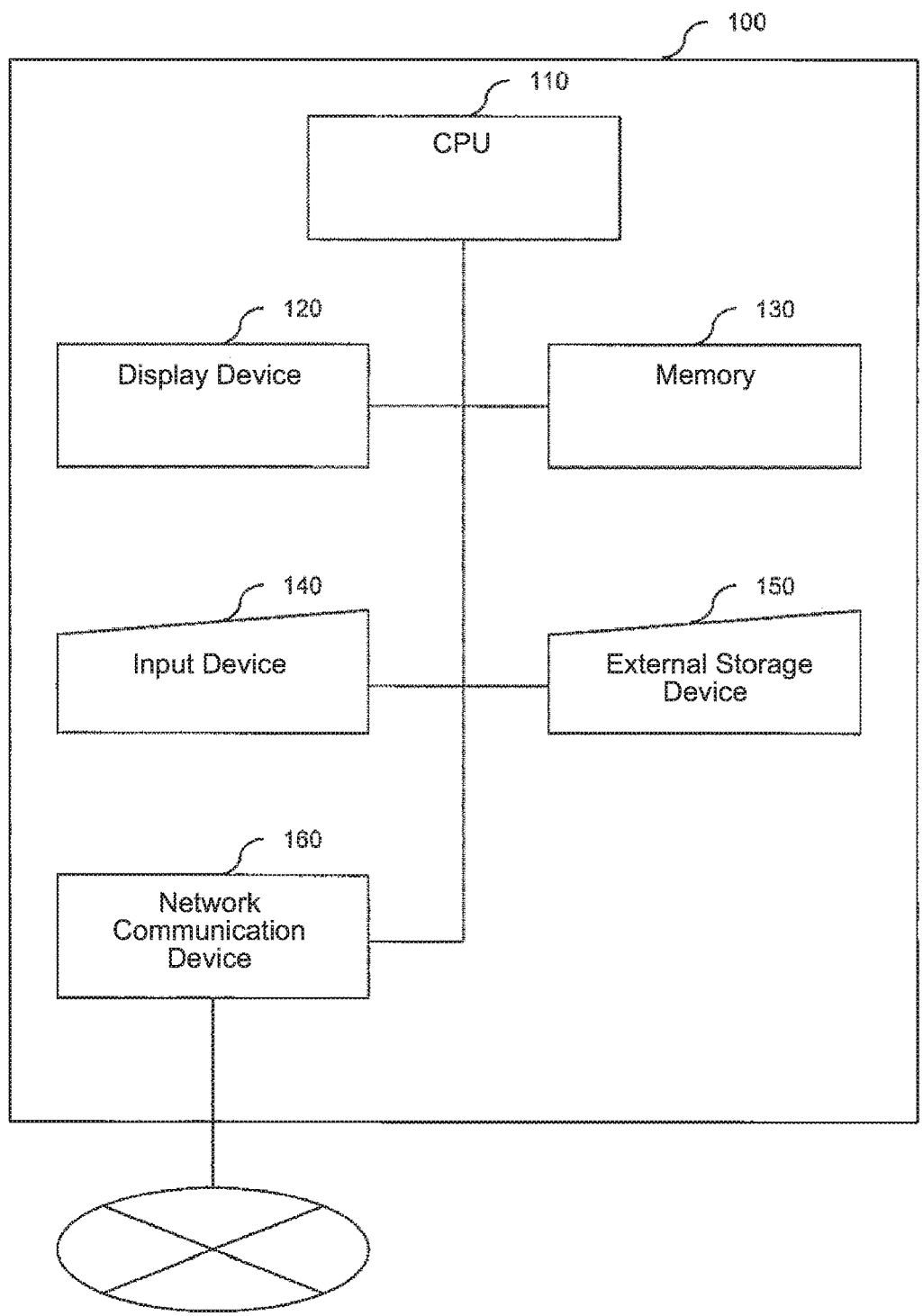
FIG. 1 is an example of a hardware configuration diagram of a device 100 for analyzing a relationship between input items of a system and internal system processing with respect to output items according to an embodiment of the present invention (hereinafter referred to as the "analysis device 100")

FIG. 1 is an example of a hardware configuration diagram of the analysis device 100 according to the present embodiment.

The analysis device 100 includes a CPU (Central Processing Unit) 110, a display device 120, a memory 130, an input device 140, an external storage device 150, and a network communication device 160 and they are connected via a bus.

Figure 2:
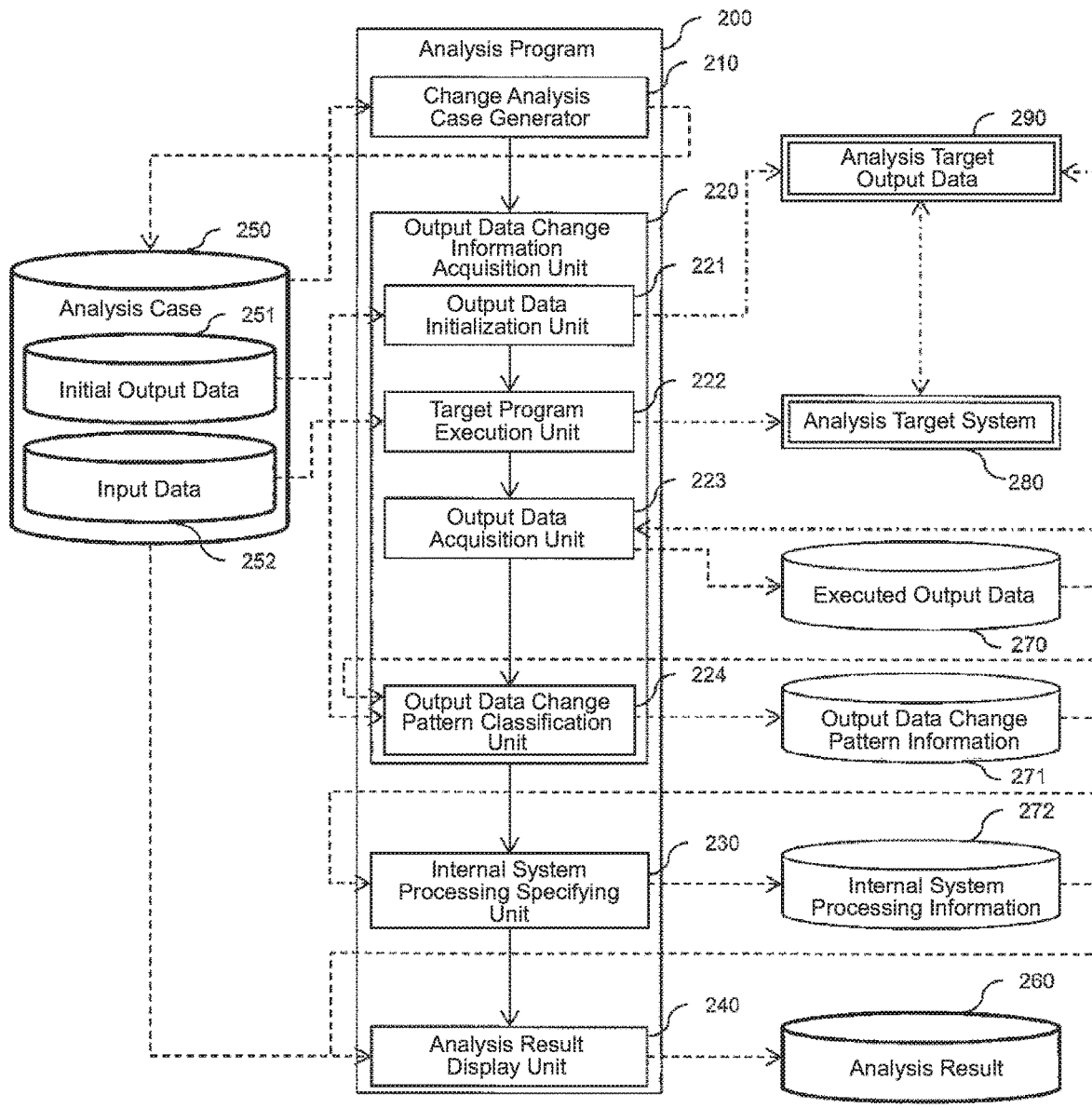
FIG. 2 is a diagram illustrating an example of a software configuration and input-output information of constituent elements of an analysis program 200 according to an embodiment of the present invention.

The external storage device 150 retains an analysis program 200 illustrated in FIG. 2 as a processing program executed by the CPU 110. The analysis program 200 is read by the external storage device 150 into the memory 130 and is executed by the CPU 110.

FIG. 2 is a diagram illustrating a software configuration of the analysis program 200 and an example of input-output information of constituent elements.

The analysis device 100 has the CPU 110 execute the analysis program 200. The analysis program 200 is composed of a change analysis case generator 210, an output data change information acquisition unit 220, an internal system processing specifying unit 230, and an analysis result display unit 240. The output data change information acquisition unit 220 operates an analysis target system 280 and analysis target output data 290 via, for example, the network communication device 160.

In order to apply the present embodiment, the analysis target output data 290 needs to have a structure and each one of data items needs to be identifiable. Examples of output data whose data items are identifiable include data of the display device 120, the memory 130, and the external storage device 150, data exchanged via the network communication device 160, and data retained by other systems. On the other hand, examples of the analysis target output data 290 to which the present invention can be hardly applied include analogue signal data. In the present embodiment, a case where DB data is used as the analysis target output data 290 will be explained.

Note that in the present embodiment, data items of the analysis target output data 290 are classified into "single data items" and "selectable data items." The data items include one or more "output elements," each of which is one unit of the output data. Examples of the output elements include DB records or a memory for a certain integer-type variable. A data item which includes two or more output elements under the condition that "when there is certain output processing, the output element can be changed uniquely by designating conditions" is called a "selectable data item," For example, regarding array data, an output element can be changed within the same data item by designating a condition of a subscript. Furthermore, regarding a DB, an output element can be changed within the same table (data item) by designating a condition for selecting an object record (output element).

The analysis target system 280 accepts input from, for example, the input device 140, the network communication device 160, or other programs and refers to, or writes data to, the analysis target output data 290. It is necessary that reference can be made to data of the analysis target output data 290 or a reference or writing log can be acquired. When the analysis target output data 290 is a DB, examples of the reference or writing log include a journal log which records the content of processing of the DB, or an SQL log which records the content of instructions of the processing of the DB. Both logs include information about the output element, which is an operation target, and the operation content. Note that the analysis target system 280 and the analysis target output data 290 may be stored in the analysis device 100. The present embodiment is characterized in that the output data change information acquisition unit 220 classifies changes of the output data and the internal system processing specifying unit 230 associates them with internal system processing.

The analysis program 200 executes, using an analysis case 250 as input, processing by the change analysis case generator 210, the output data change information acquisition unit 220, the internal system processing specifying unit 230, and the analysis result display unit 240, and outputs an analysis result 26. In the present embodiment, firstly, (1) the change analysis case generator 210 executes processing by inputting the analysis case 250, thereby acquiring a new analysis case 250. In the following explanation, the analysis case 250 which is prepared as input to the analysis program 200 will be referred to as a reference analysis case and the new analysis case 250 generated by the change analysis case generator 210 will be referred to as a changed analysis case. Next, (2) the output data change information acquisition unit 220 executes processing by inputting the analysis case 250, thereby acquiring output data change pattern information 271. Under this circumstance, the output data change pattern information 271 obtained by inputting the reference analysis case will be referred to as reference output data change information and the output data change pattern information 271 obtained by inputting the changed analysis case will be referred to as changed output data change pattern information. Moreover, (3) the internal system processing specifying unit 230 executes processing by inputting two pieces of the output data change pattern information 271 (the reference output data change pattern information and the changed output data change pattern information), thereby acquiring internal system processing information 272. Subsequently, (4) when there are other analysis cases 250, the procedures (1) to (3) are repeated until there is no more prepared analysis case 250 left or analysis of an arbitrary input item is completed. Lastly, (5) the analysis result display unit 240 executes processing by inputting all the analysis cases 250 and the internal system processing information 272, thereby outputting an analysis result 260.

The change analysis case generator 210 accepts the analysis case 250 as input, changes a value of an input item by an arbitrary method, and outputs a new analysis case 250 as the changed analysis case. Examples of the changing method include a method of incrementing or decrementing numbers, a method of adding arbitrary characters to a character string, or a method of deleting arbitrary characters from a character string. Information to clearly specify the changing method for each input item may be given or restrictions may be imposed in order to set change policies. Note that in the present embodiment, the changed analysis case is generated by the change analysis case generator 210; however, the analysis program 200 may not be equipped with the change analysis case generator 210 and the changed analysis case may be given manually.

The output data change information acquisition unit 220 accepts the analysis case 250 as input and outputs the output data change pattern information 271. The output data change information acquisition unit 220 has at least: a function that makes two types of input to the analysis target system 280; and a function that observes changes of the output data caused by the input and classifies them into output data change patterns. For example, when DB data are used as the analysis target output data 290, a journal log, an SQL trace log, dumps of the DB data, and so on can be used in order to acquire the changes of the output data. In the present embodiment, a method of dumping and comparing the DB data will be explained.

The internal system processing specifying unit 230 accepts the reference output data change pattern information and the changed output data change pattern information as input and outputs the internal system processing information 272. The analysis result display unit 240 accepts the analysis case 250 and the internal system processing information 272 as input and outputs the analysis result 260 as output of the analysis program 200.

Now, constituent elements of the output data change information acquisition unit 220 will be explained. The output data change information acquisition unit 220 accepts the analysis case 250 as input, executes processing of an output data initialization unit 221, a target program execution unit 222, an output data acquisition unit 223, and an output data change pattern classification unit 224, and outputs the output data change pattern information.

The analysis case 250 is composed of initial output data 251 and input data 252. The initial output data 251 is output data which has the same structure as that of the analysis target output data 290. Moreover, the input data 252 is a set of input values to be entered to input items of the analysis target system 280.

Furthermore, the output data change pattern information 271 is information obtained by classifying changes of the analysis target output data 290 into the "output data change patterns" when a screen input based on the input data 252 is entered to the analysis target system 280. The output data change patterns include "Output Element Addition," "Output Element Deletion," "Output Element Update," and "No Change." The output data change pattern information 271 has at least a data item which has changed, the initial output data 251, the executed output data 270, and the output data change patterns.

The output data initialization unit 221 accepts the initial output data 251 as input and replaces data of the analysis target output data 290 with the initial output data 251.

The target program execution unit 222 accepts the input data 252 as input and inputs the input data to the analysis target system 280.

The output data acquisition unit 223 dumps, for example, data of the analysis target output data 290 to make it the executed output data 270. Regarding a dumping method in a case of the DB data, a dedicated dumping tool may be used or an SQL query may be used.

The output data change pattern classification unit 224 accepts the initial output data 251 and the executed output data 270 as input and outputs the output data change pattern information 271.

Note that analysis of the internal system processing can be performed by a method of executing processing of the output data acquisition unit 223 instead of the output data initialization unit 221. In this case, the same results as those of the present embodiment can be obtained by not including the initial output data 251 in the analysis case 250 and using the output data, which is acquired before the processing of the target program execution unit 222, as the initial output data 251, However, when the same input is given twice and different output data changes are obtained, correct analysis result may not be sometimes obtained. This is because the output data which is changed by the input for the first time is used for the processing relating to the input for the second time.

Figure 3:
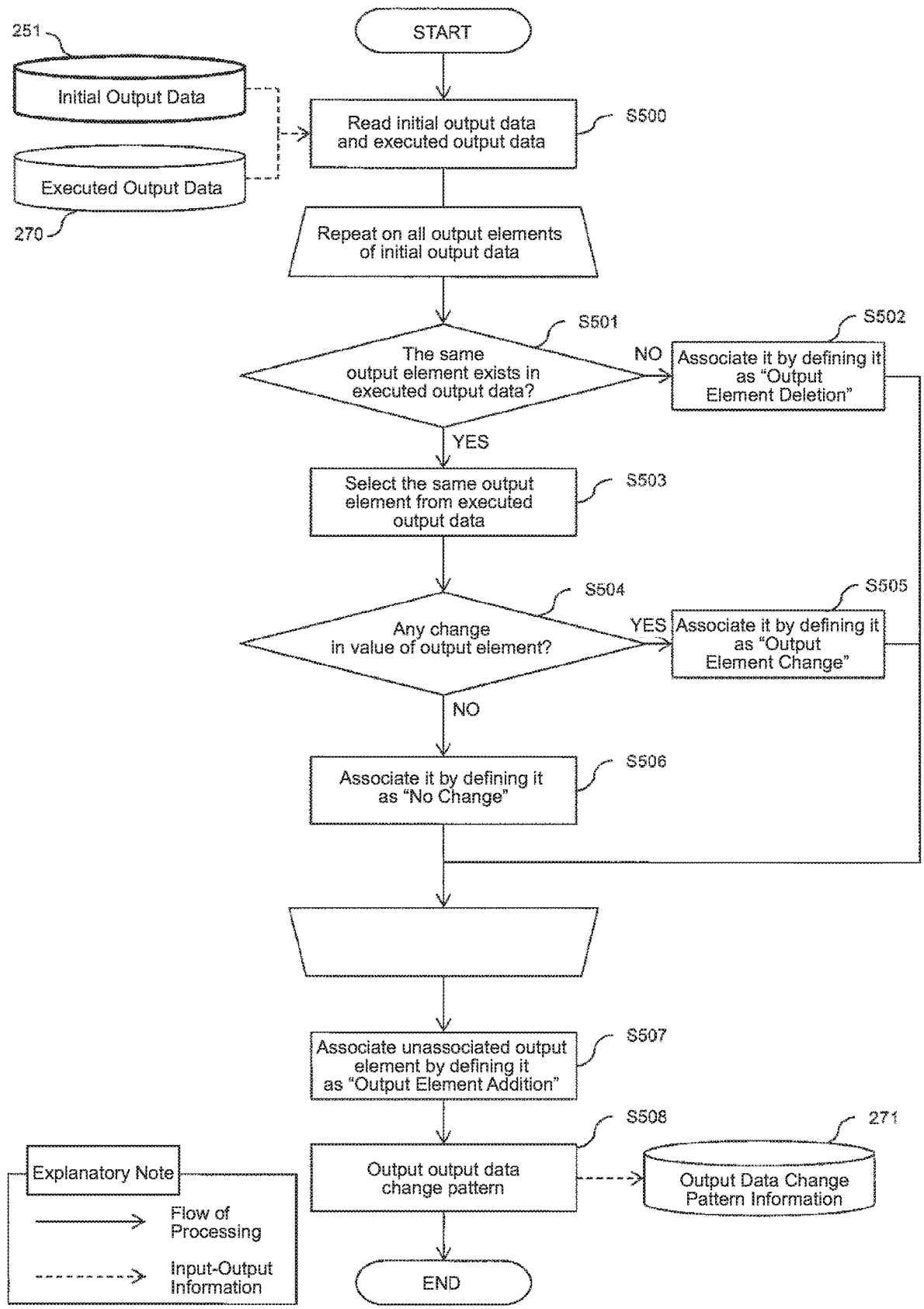
FIG. 3 is a flowchart illustrating an example of a processing sequence of an output data change pattern classification unit 224 according to an embodiment of the present invention.

FIG. 3 is a flowchart illustrating an example of a processing sequence of the output data change pattern classification unit 224.

This procedure is intended to assign the output data change patterns to the output elements included in the initial output data 251 and the executed output data 270.

Firstly, the initial output data 251 and the executed output data 270 are read (step S500). Steps S501 to S506 are repeated sequentially with respect to all the output elements of the initial output data which have been read.

In step S501, the output data change pattern classification unit 224 checks if the same output element exists in the executed output data or not. In a case of a selectable data item, for example, the following methods are used as a method for identifying the same output element; (A) determine an output element whose all values are the same to be the same output element; (B) determine an output element whose value of at least key item is the same to be the same output element; and (C) determine an output element whose all values of items other than the key item of (B) are the same to be the same output element. Note that many logs contain information capable of identifying an operation target output element, so that when the output data change information acquisition unit 220 uses a journal log, an SQL trace log, and so on, the same output element can be identified by analyzing the logs. When the same output element exists as a result of checking, the processing proceeds to step S503; and when the same output element does not exist, the processing proceeds to step S502. In step S502, the output data change pattern of the selected output element of the initial output data is defined as "Output Element Deletion."

In step S503, the output data change pattern classification unit 224 acquires an output element of the executed output data corresponding to the selected output element of the initial output data and defines these output elements as a set of the output elements.

In step S504, the output data change pattern classification unit 224 checks if there is a difference in the values of the output elements which are defined as the set in step S503. When there is any difference, the processing proceeds to step S505; and when there is no difference, the processing proceeds to step S506.

In step S505, the output data change pattern classification unit 224 defines the output data change pattern of the output element set obtained in step S503 as the "Output Element Change."

In step S506, the output data change pattern classification unit 224 defines the output data change pattern of the output element set obtained in step S503 as "No Change."

In step S507, the output data change pattern classification unit 224 defines the output data change pattern of an output element which has not been associated yet, from among output elements of the executed output data, as the "Output dement Addition."

In step S508, the output data change pattern classification unit 224 collects the output elements and the output data change patterns, which have been associated with each other in steps S500 to S507, and outputs them as the output data change pattern information 271.

Figure 4:
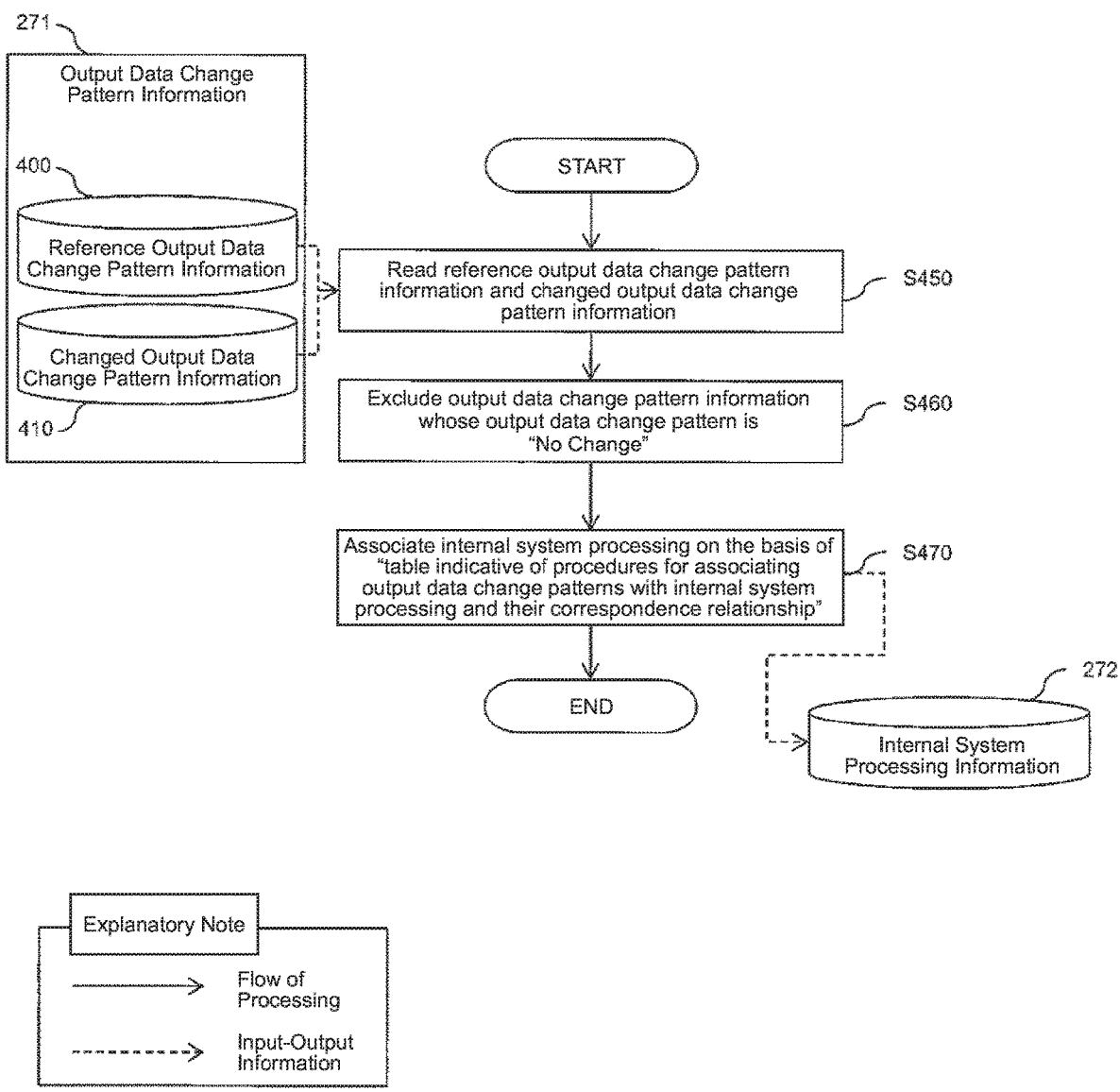
FIG. 4 is a flowchart illustrating an example of a processing sequence of and internal system processing specifying unit 230 according to an embodiment of the present invention.

FIG. 4 is an example of a flowchart of the internal system processing specifying unit 230. This procedure is intended to associate reference output data change pattern information 400 with changed output data change pattern information 410 by certain standards and associate them with the internal system processing.

The internal system processing classified by the internal system processing specifying unit 230 includes "branching processing," "output element selection processing," "output value determination processing," and "output irrelevance processing."

The "branching processing" means that there is branching processing for using an input item, whose input value is changed by the change analysis case generator 210, as a branching condition. The "branching processing" is executed when the output data change pattern changes and when both the output data change patterns are the "Output Element Change" and output items of output elements to be updated are different. Generally, since such change cannot be caused by the same output processing, it is necessary to execute different output processing by using control syntax. Note that in some case, the same output processing is used to execute the output processing on different output items; however, that can be implemented because the output items have a special relationship. An example of the special relationship would be when the output items are located next to each other in the memory.

In the present embodiment, such a special relationship is not assumed and the internal system processing is specified only on the basis of the relevance between the output items and the output elements, so that an analysis result which is different from actual implementation may sometimes be obtained. However, since it remains true that output of the relevant processing has been switched to a different output item, there would be no problem even if the analysis result different from the implementation is output. The implementation and the analysis result may be different with respect to other than the branching processing, but it is acceptable in the same manner as the output processing.

The "output element selection processing" means that there is processing for using an input item whose input value is changed by the change analysis case generator 210, in order to select an output element to be deleted/changed from within the same output item. The "output element selection processing" is executed when both the output data change patterns are the "Output Element Deletion" and different output elements within the same output item are deleted and when both the output data change patterns are the "Output Element Update" and different output elements within the same output item are different by being updated. Note that in a case where the processing falls under the "branching processing," it will not be associated with the "output element selection processing."

The "output value determination processing" means that there is processing for using an input item whose input value is changed by the change analysis case generator 210, in order to decide a value to be written to output. The "output value determination processing" is executed when both the output data change patterns are the "Output Element Addition" and values of the updated output elements are different and when both the output data change patterns are the "Output Element Change" and the values of the updated output elements are different. Note that in a case where the processing falls under the "branching processing" or the "output element selection processing," it will not be associated with the "output value determination processing."

The "output irrelevance processing" means that there is processing in which the input item whose input value is changed by the change analysis case generator 210 does not influence the output. In a case where the processing does not fall under the "branching processing," the "output element selection processing," or the "output value determination processing," the "output irrelevance processing" is executed.

Firstly, in step S450, the reference output data change pattern information 400 and the changed output data change pattern information 410 are read.

Next, the internal system processing specifying unit 230 removes the output data change pattern information 271, whose output data change pattern is "No Change," from the output data change pattern information 271 which has been read. When all pieces of the output data change pattern information 271 have been removed, the internal system processing specifying unit 230 assigns the "output irrelevance processing" and terminates the processing.

Lastly, regarding the remaining output data change pattern information 271, the internal system processing specifying unit 230 associates the internal system processing with the output data change pattern information on the basis of the "table illustrating procedures for associating the output data change patterns with the internal system processing and the correspondence relationship between them" in FIG. 5.

FIG. 5 is a table 500 indicative of procedures for associating output data change patterns with internal system processing and their correspondence relationship (hereinafter referred to as the correspondence table 500). These procedures are intended to specify what kind of internal system processing the differences between the reference output data change pattern information 400 and the changed output data change pattern information 410 are attributable to.

The correspondence table 500 is composed of two parts. The first part is columns for an item number with a Roman number, a target, and an association method. This part represents conditions for searching a set of the reference output data change pattern information 400 and the changed output data change pattern information 410 which are comparison targets. The second part is composed of columns for an item number with an Arabic number, internal system processing, and conditions. This part represents rules to decide the internal system processing to be assigned to the set of the output data change pattern information 271 selected in the first part. The rules of the item numbers 1 to 4 in the second part are used for the item numbers I to V of the first part. Moreover, the rule for the item number 5 of the second part is used for the item number VI of the first part. Regarding both the parts, a conditional judgment is made sequentially in ascending order of the item number.

With the item number I, the reference output data change pattern information 400 and the changed output data change pattern information 410 which have the same output data change pattern information 271 are combined.

With the item number II, the reference output data change pattern information 400 and the changed output data change pattern information 410 which have the output data change pattern information 271 that matches at least except for the initial output element are combined.

With the item number III, the reference output data change pattern information 400 and the changed output data change pattern information 410 which have the output data change pattern information 271 that matches at least except for the initial output element or a value to be changed are combined.

With the item number IV, the reference output data change pattern information 400 and the changed output data change pattern information 410 which have the output data change pattern information 271 that matches at least except for the initial output element or an output element or value to be changed are combined.

With the item number V, the reference output data change pattern information 400 and the changed output data change pattern information 410 which have the output data change pattern information 271 that matches at least except for the initial output element or an output item, output element, or value to be changed are combined.

Subsequently, the output data change pattern information 271 combined regarding the item numbers I to V are judged sequentially from the top to see if it satisfies the conditions for the item numbers 1 to 4; and then the output data change pattern information 271 is associated with the internal system processing.

Lastly, the output data change pattern information 271 for which no combination is found regarding the item numbers I to V is associated with the branching processing.

Operation examples of the analysis device 100 according to the present embodiment will be explained below. A DB will be used as the analysis target output data 290. Moreover, an output item is a column and an output element is a record.

Figure 6:
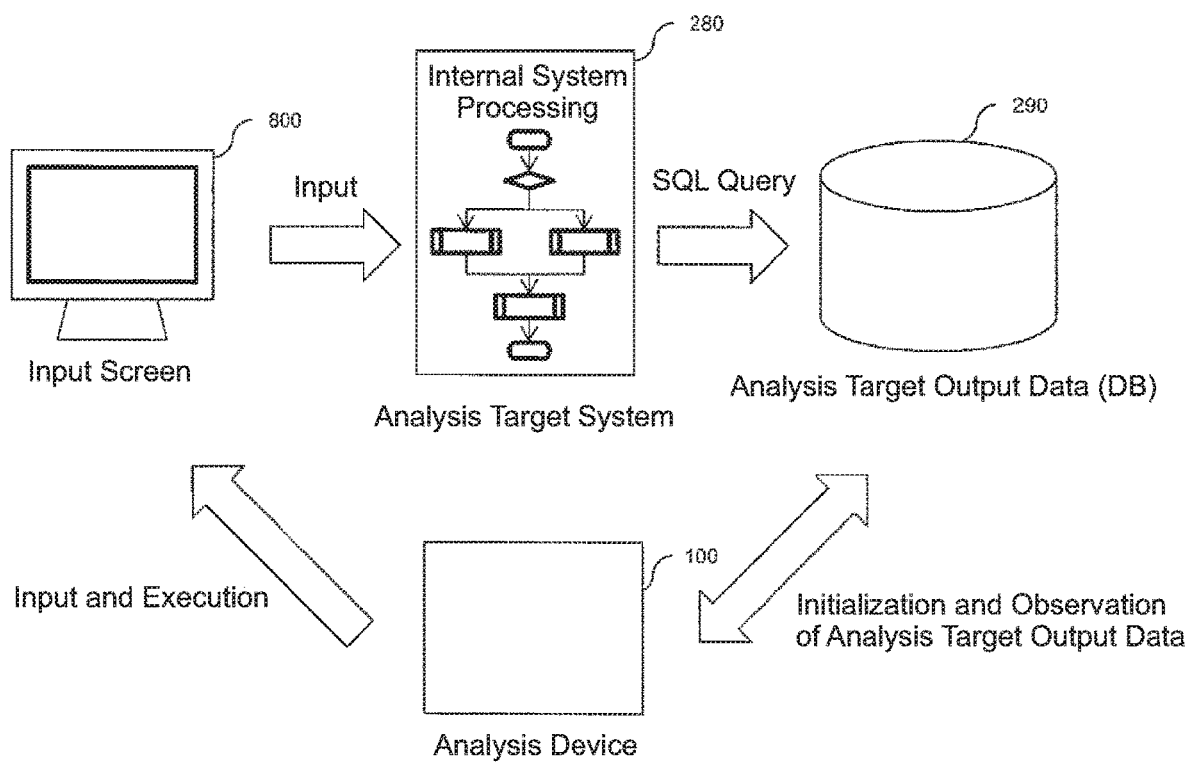
FIG. 6 is a hardware configuration diagram illustrating the relationship between an analysis target system 280 and analysis target output data 290 which are analysis targets according to an embodiment of the present invention, and the analysis device 100.

FIG. 6 is a diagram illustrating an example of a hardware configuration of the analysis target system 280 and the analysis target output data 290 which are targets to be analyzed in the present embodiment, and the analysis device 100.

The analysis target system 280 accepts input from the input screen 800 and executes an SQL query to change the analysis target output data 290, while executing the internal system processing.

The analysis device 100 makes input to the input screen 800 by means of the processing of the target program execution unit 222, initializes the analysis target output data 290 by means of the processing of the output data initialization unit 221, and acquires the analysis target output data 290 by means of the processing of the output data acquisition unit 223.

Figure 7:
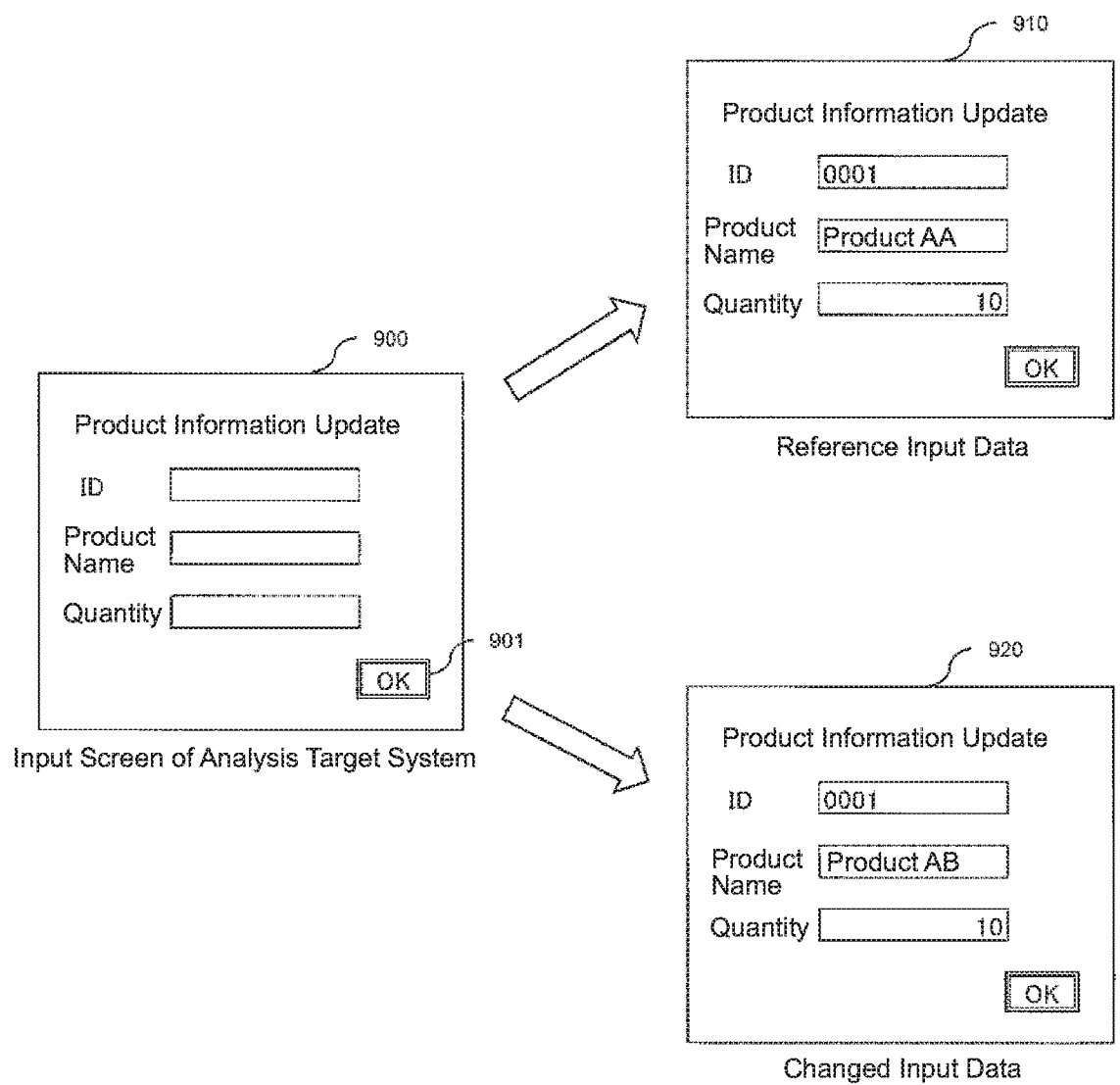
FIG. 7 is a diagram illustrating an example of an input screen 800 of the analysis target system 280 and input according to an embodiment of the present invention.

FIG. 7 is a diagram illustrating an example of the input screen 800 of the analysis target system 280 and inputs according to the present embodiment.

In the present embodiment, input items of a product information update screen 900 to update product information are analyzed. The input items of this screen are an "ID" for uniquely identifying a product, a "product name" representing the name of the product, and a "quantity" representing the quantity of the product. As an OK button 901 is pressed, the processing is executed by the analysis target system 280 by using input values which are entered to the respective input items.

Reference input data 910 and changed input data 920 are examples of the input data 252. In this example, an example in which the product name "Product AA" of the reference input data 910 is changed by the change analysis case generator 210 to "Product AB" that is then defined as the changed input data 920 is illustrated.

Figure 8:
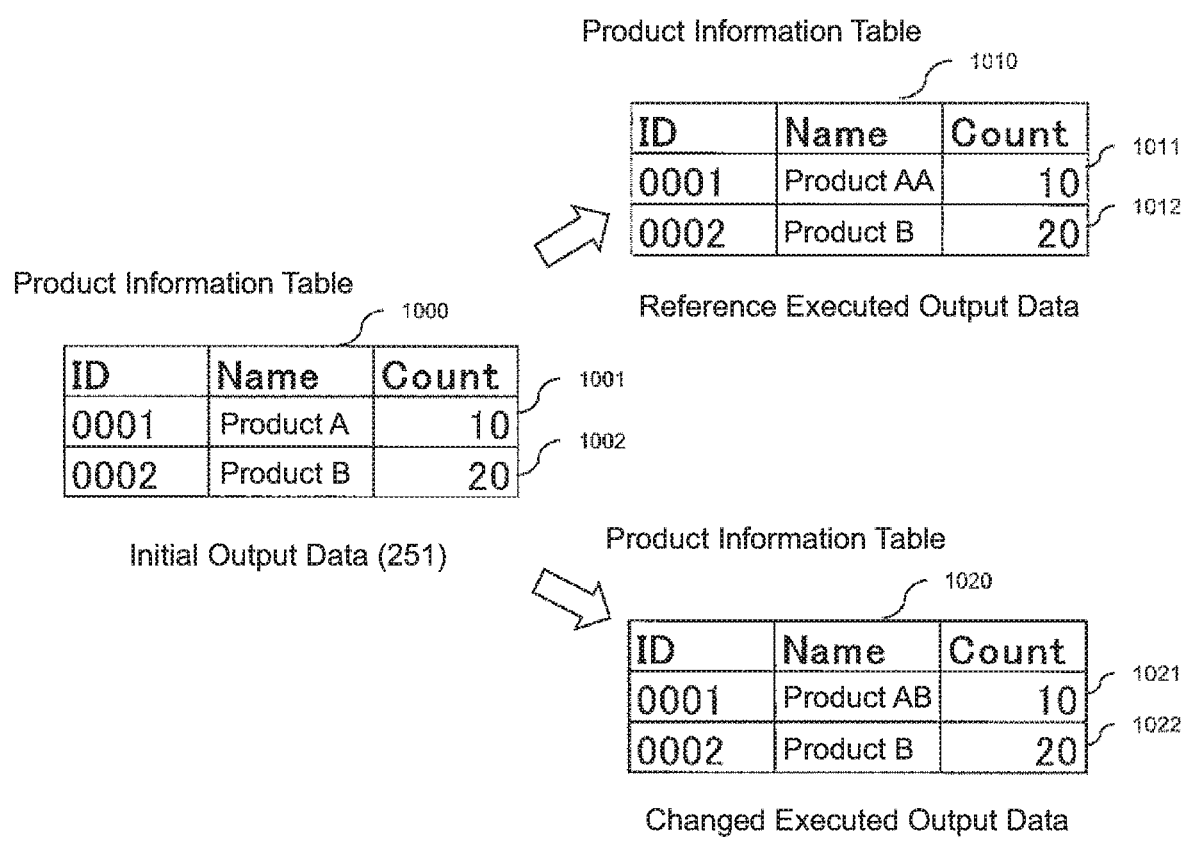
FIG. 8 is an example of initial output data 251 of the analysis target output data 290 and executed output data 270 after input to the system according to an embodiment of the present invention.

FIG. 8 is a diagram illustrating an example of the initial output data 251 of the analysis target output data 290 and the executed output data 270 after input to the system according to the present embodiment.

In the present embodiment, a product information table 1000 which stores information about products is used. The product information table 1000 has ID, Name, and Count columns. The key is the ID column. The product information table 1000 illustrates the initial output data 251 used in the present embodiment. Reference executed output data 1010 shows the reference executed output data after inputting the reference input data 910. Furthermore, changed executed output data 1020 shows changed executed output data after inputting the changed input data 920. Regarding the reference executed output data 1010 and the changed executed output data 1020, the value of the Name column of an output element whose ID is 1 (an output element 1011 and an output element 1021) is changed from "Product Name AA" to "Product Name AB."

Figure 9:
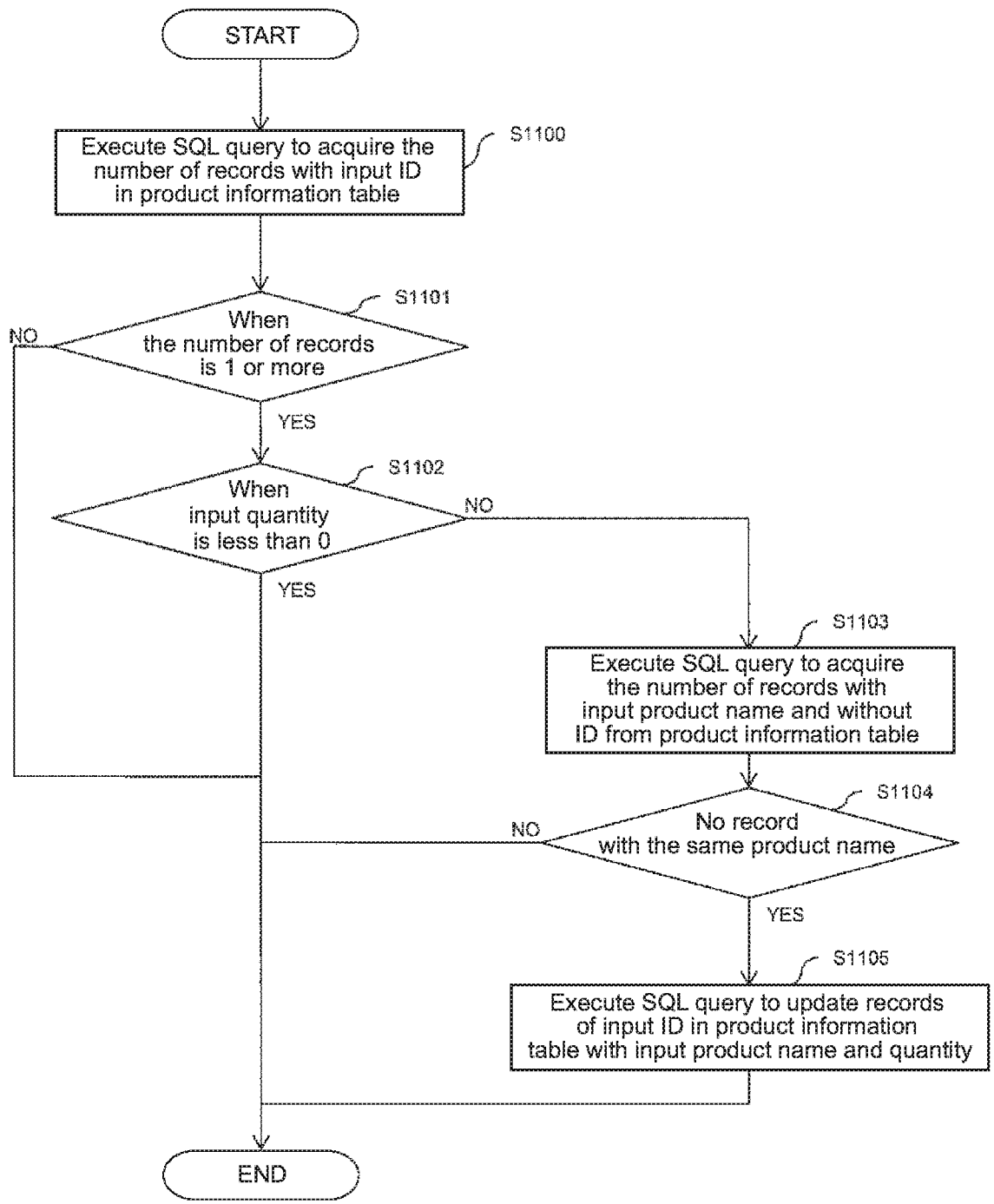
FIG. 9 is a flowchart illustrating processing content of the analysis target system 280 according to an embodiment of the present invention.

FIG. 9 is a flowchart illustrating processing content of the analysis target system 280 according to the present embodiment.

The processing illustrated in this drawing is executed by pressing the OK button 901 on the product information update screen 900. Rules for the processing will be explained below. The first rule is to interrupt the processing when the input item "ID" of the product information update screen 900 is not registered in the DB data. The second rule is to interrupt the processing when the input item "Quantity" of the product information update screen 900 is a negative value. The third rule is to interrupt the processing when the input item "Product Name" of the product information update screen 900 is already registered.

Firstly, a SQL query, which is for acquiring the quantity of output elements of the product information table 1000 having an input value entered in the input item "ID" as an ID column, is executed (step S1100). For example, this is "SELECT COUNT(ID) FROM PRODUCT INFORMATION TABLE WHERE ID='1'."

Next, the analysis target system 280 judges whether the quantity of output elements acquired in step S1100 is one or more (step S1101). When the quantity of output elements is one or more, the processing proceeds to step S1102. Otherwise, the analysis target system 280 terminates the processing. In step S1102, the analysis target system 280 judges whether the input value of the input item "Quantity" entered via the product information update screen 900 is less than 0. When the input value of the input item "Quantity" is less than 0, the analysis target system 280 terminates the processing. Otherwise, the processing proceeds to step S1103.

In step S1103, an SQL query, which is for acquiring the quantity of output elements of the product information table 1000 having an input value of the input item "Product Name" entered via the product information update screen 900 as a Name column, is executed. For example, this is "SELECT COUNT(ID) FROM PRODUCT INFORMATION TABLE WHERE NAME='PRODUCT NAME AA' AND ID< >'1'".

In step S1104, the analysis target system 280 judges whether the quantity of output elements acquired in step S1103 is 0. When the quantity of output elements is 0, the processing proceeds to step S1105. Otherwise, the analysis target system 280 terminates the processing.

In step S1105, an SQL query, which is for updating an output element of the product information table 1000 having the input value of the input item "ID" entered via the product information update screen 900, is executed. Upon updating the output element, the input value of the input item "Product Name" is used as the value of the Name column and the input value of the input item "Quantity" is used as the value of the Count column. An example of the SQL query is "UPDATE PRODUCT INFORMATION TABLE SET NAME='PRODUCT NAME AA', COUNT='10' WHERE ID='1'."

FIG. 10 illustrates the output data change pattern information 271 which is the results of classification of output data change patterns according to the present embodiment.

The reference output data change pattern information 400 is an output example when the processing of the output data change pattern classification unit 224 is executed by inputting the initial output data 1000 and the reference executed output data 1010. Moreover, the changed output data change pattern information 410 is an output example when the processing of the output data change pattern classification unit 224 is executed by inputting the initial output data 1000 and the changed executed output data 1020. Since the reference output data change pattern information 400 and the changed output data change pattern information 410 can be extracted by the same processing sequence, a specific example will be explained with reference to FIG. 3 only with respect to the processing sequence of the reference output data change pattern information 400.

In step S500, the initial output data 1000 and the reference executed output data 1010 are read. The output data change pattern classification unit 224 executes steps S501 to S506 sequentially with respect to two output elements of the initial output data 1000.

Firstly, the first output element 1001 will be explained. In step S501, the output data change pattern classification unit 224 searches the reference executed output data 1010 for an output element with the same key and then finds the first output element 1011, so that the processing proceeds to step S503. In step S503, the output data change pattern classification unit 224 selects the output element 1011 and the processing proceeds to step S504. In step S504, the output data change pattern classification unit 224 checks if there is any difference between the output element 1001 and the output element 1011. In this example, their values of the Name column are "Product Name AA" and "Product Name AB" and are different, so the processing proceeds to step S505. In step S505, the output data change pattern classification unit 224 defines the output data change pattern of the output element 1001 and the output element 1011 as the "Output Element Change" and associates them with each other.

Similarly, the second output element 1002 will be explained. In step S501, the output data change pattern classification unit 224 searches the reference executed output data 1010 for an output element with the same key and then finds the second output element 1012, the processing proceeds to step S503. In step S503, the output data change pattern classification unit 224 selects the output element 1012 and the processing proceeds to step S504. In step S504, the output data change pattern classification unit 224 checks if there is any difference between the output element 1002 and the output element 1012. Since there is no difference in this example, the processing proceeds to step S506. In step S506, the output data change pattern classification unit 224 defines the output data change pattern of the output element 1002 and the output element 1012 as "No Change" and associates them with each other.

As the processing of steps S501 to S506 is completed with respect to all the output elements included in the initial output data 1000, the processing proceeds to step S507. Since no output element which has not been associated with the output data change pattern yet is left in either the initial output data 1000 or the reference executed output data 1010, the processing proceeds to step S508.

In step S508, the output data change pattern classification unit 224 outputs the results of associating the output elements with the output data change patterns in steps S501 to S507 to the display device 120, the memory 130, the external storage device 150, and the network communication device 160.

FIG. 11 is a diagram illustrating the internal system processing information 272 which is the results of specifying the internal system processing according to the present embodiment.

FIG. 11 shows an example of the results of executing the processing of the internal system processing specifying unit 230 by inputting the reference output data change pattern information 400 and the changed output data change pattern information 410 illustrated in FIG. 10. A specific example will be explained with reference to FIG. 4.

Firstly, in step S450, the reference output data change pattern information 400 and the changed output data change pattern information 410 are read.

Next, in step S460, the internal system processing specifying unit 230 removes the output data change pattern information 271 whose output data change pattern is "No Change." In the present embodiment, the output data change pattern information whose initial output element is the second output element (the output data change pattern information 402 and 412) is removed.

Next, the internal system processing specifying unit 230 specifies the internal system processing on the basis of the correspondence table 500. As the internal system processing specifying unit 230 checks if the remaining output data change pattern information 401 and 412 satisfies the conditions for the item numbers I to V, it is found that the item number III indicating "a set of output data change pattern information that matches at least except for the initial output element or the value to be changed" is satisfied. Thus, the internal system processing specifying unit 230 checks the conditions for the item numbers 1 to 4, and associates the condition with the internal system processing.

As the internal system processing specifying unit 230 checks the conditions for the item numbers 1 to 4, it is found that the item number 3 indicating "when #1 and #2 are not applicable and both output data change patterns are "Output Element Change" and the values of changed output elements are different" is satisfied.

As a result, it would be found that "output value determination processing" which uses the input item "Product Name" with its value changed and causes changes of the output data change pattern information 401 and 412 exists.

FIG. 12 is a diagram illustrating an example of output results when the internal system processing information 272 obtained by repeatedly performing analysis on the analysis target system 280 is collectively output.

The analysis result 260 has at least an input item, an output item, and internal system processing. The analysis result 260 is obtained by repeatedly executing the output data change information acquisition unit 220, the change analysis case generator 210, and the internal system processing specifying unit 230 while changing the values of the input item "ID," the input item "Quantity," and the product information table of the DB, B, S, and O in the table represent the branching processing (Branch), the output element selection processing (Select), and the output value determination processing (Output), respectively. Furthermore, C, R, U, and D represent Create, Read, Update, and Delete, respectively. For example, regarding a row indicating whether CRUD exists or not, when "white circle" is indicated in U (Update) in the Name column of the product information table, it means that the value of the relevant column is updated by the processing associated with the product information update screen 900. Furthermore, regarding a row of a screen input item "ID," BS indicated in U (Update) in the Name column of the product information table means that the branching processing and the output element selection processing which use the input value of the input item "ID" of the product information update screen 900 exist. Specifically speaking, it means that processing for changing whether the value of the Name column is updated or not on the basis of the value of the input item "ID," and processing for using the value of the input item "ID" to select the output element to be updated exist.

Now, an example of necessary input to specify, as the analysis result, BS which is indicated in U (Update) in the Name column of the product information table in the row of the screen input item "ID" will be explained. In a case of the initial output data 1000, as the analysis is performed by using the reference input data 910 and the changed input data obtained by changing the value of the input item "ID" of the reference input data 910 to 3, whether to execute the SQL query to update (U) the Name column changes. Thus, it can be recognized that the branching processing (B) regarding the input item "ID" exists. Similarly, as the analysis is performed by using the changed input data obtained by changing the value of the input item "ID" of the reference input data 910 to 2, the output element which is the update (U) target changes from the first output element to the second output element. Thus, it can be recognized that the output element selection processing (S) regarding the input item "ID" exists.

Note that upon generating the analysis result 260, when there is an input item which has not been changed through all the analysis cases 250, it means that the analysis of that input item has not been performed. Thus, the relevant input item of the analysis result 260 may be highlighted.

By the way, there is processing which cannot be analyzed according to the present embodiment. For example, in step S1100, the analysis target system 280 executes processing for reading the ID of the product information table 1000. However, "white circle" is not assigned to R (Read) in the ID column or the product information table with respect to the row indicating whether CRUD exists of not regarding the analysis result 260. Under this circumstance, let us assume a case where input indicating that the input item "ID" is 3, the input item "Product Name" is Product Name AC, and the input item "Quantity" is 10 is entered for the initial output data 1000 when step S1100 and step S1101 do not exist. In this case, step S1105 is executed and, for example, an SQL query such as "UPDATE PRODUCT INFORMATION TABLE SET NAME='PRODUCT NAME AC', Count='10' WHERE ID='3'" is executed. This SQL query does not cause any changes of the output data with respect to the initial output data 1000. In other words, whether step S1100 and step S1101 exist or not does not affect changes of the output data associated with changes of the input values. Accordingly, the present invention cannot analyze the processing which does not involve the changes of the output data associated with the changes of the input values. However, since it is an object of the present invention to associate the input items with the internal system processing which affects the changes of the output items, there will be no problem even if Reference (R) of the ID column is not output as the analysis result.

FIG. 13 is a diagram illustrating an example of screen output to support understanding of the relationship between the input items of the system and the internal system processing with respect to the output items. In this example, an example of classifying and displaying analysis cases 250 is illustrated when changes occur or do not occur as a result of the branching processing when pressing the B part in U of the Name column of the product information table with respect to an input item name "ID" of analysis result outlines 1510.

An output screen 1500 includes at least an input item, an output item, internal system processing, and information about specific analysis cases. Note that in a case of the branching processing, the analysis cases 250 may be grouped and displayed on the basis of whether a change exists or not; in a case of the output element selection processing, the analysis cases 250 may be grouped and displayed on the basis of each output element which becomes an operation target; and in a case of the output value determination processing, the analysis cases 250 may be grouped and displayed on the basis of each output value. Furthermore, other input items which may possibly be used for the branching processing, the output element selection processing, and the output value determination processing may be highlighted. Furthermore, input items which can be assumed to be highly possibly used, from among the input items which may possibly be used for the branching processing, the output element selection processing, and the output value determination processing, may be highlighted. Additionally, input items regarding which the types of necessary analysis cases are insufficient in order to extract the relationship between the input items and the internal system processing with respect to the output items may be highlighted.

The output screen 1500 in the present embodiment indicates the results regarding the branching processing and an analysis detail display section 1520 indicates information by performing grouping on the basis of whether a branch change exists or not, underlining other input items which may possibly be used for the branching processing, and also underlining input item names which can be assumed to be highly possibly used. As a result of using the output screen 1500, the screen input item "ID" is compared with at least one of the screen input item "Product Name," the screen input item "Quantity," the ID column of the product information table, and the Name column of the product information table; and as a result, it can be recognized that implementation regarding which whether the processing for updating the Name column exists or not changes exists. Furthermore, by comparing an input list when changed 1521 with an input list when unchanged 1522, it can be recognized that a change occurs only when the value of the screen input item "ID" is included in the ID column of the product information table. Consequently, you can say that the branching processing for judging whether the value of the screen input item "ID" is included in the ID column of the product information table or not may possibly be executed. Thus, the input item name in the ID column of the product information table is underlined.

The reason why other input items which may possibly be used for the branching processing can be specified is as follows. Regarding Update (U) in the Name column of the product information table, input items related to the branching processing (B) are all input items other than the Count column of the product information table. Therefore, there is a possibility that all input items other than the Count column of the product information table may be used for comparison with the screen input item "ID."

Now, an example of a method for estimating an input item which may highly possibly and particularly be used will be explained with reference to FIG. 14.

FIG. 14 is a list created by grouping the analysis cases 250 indicated in the analysis details 1520 in FIG. 13. When grouping the analysis cases 250, the analysis cases 250 regarding which the values of input items other than a certain input item are the same are gathered. For example, an example 1600 of grouping the analysis cases 250 with the same input values except for the ID column of the first output element is an example in which the analysis cases 250 having the same input item values except for the first output element (a first record in the ID column of the product information table) in the DB that is the initial output data 251 are grouped. This table shows that analysis case #1-1 and analysis case #2-1, analysis case #3-1' and analysis case #3-1, analysis case #1-3 and analysis case #2-3, and analysis case #1-2 and analysis case #2-2 are grouped. In this table, groups having different information as to whether a change in the same group exists or not indicate that whether a change exists or not changes depending on a change of the value of an attention-focused input item. In other words, it can be recognized that the value of the attention-focused input item is used for the branching processing for determining whether a change exists or not. For example, regarding the analysis case #3-1' and the analysis case #3-1, no change has occurred in the analysis case #3-1' and a change has occurred in the analysis case #3-1. Thus, it can be recognized that a change in the value of the input item ID column is used for the branching processing for determining whether a change occurs or not. In the example 1600 of grouping the analysis cases in which attention is focused on the ID column, a row of the analysis cases 250 regarding which whether a change exists or not has changed in the same group are highlighted in bold.

It is possible to identify the input items used for the branching processing, the output element determination processing, and the output value determination processing by sequentially performing the above-described analysis of all the input items.

Note that an example 1610 of grouping analysis cases regarding which attention is focused on the Name column shows an example where not even one group including a plurality of analysis cases 250 can be formed. In this case, an input item used for each processing cannot be identified. In order to solve this problem, it is only necessary to generate a new analysis case(s) 250 which can be grouped, and repeat the analysis. For example, as an analysis case which can be grouped with the analysis case #1-1, there is an analysis case 250 regarding which the Name column of the first output element of the analysis case #1-1 is changed to Product Name X. When not even one group can be formed or a small number of groups are formed as in the case of the example 1610 of grouping the analysis case regarding which attention is focused on the Name column, there is a possibility that a failure in detecting the input item(s) used for the processing may occur. Thus, the input item(s) with a small number of groups may be highlighted on the output screen 1500 or the like. Furthermore, information about the input items whose analysis cases 250 are insufficient may be used in order to decide the change policies of the change analysis case generator 210.

Consequently, according to the present embodiment, the relationship between the input items of the existing system and the internal system processing with respect to the output items can be extracted even when there is no source code. Furthermore, since the input items and the output items which are required to examine the content of the internal system processing can be narrowed down by using the output screen 1500, it is possible to contribute to understanding of the specifications of the existing system.

Embodiment 2

Embodiment 1 has described an example in which only the value of one input item is changed by the change analysis case generator 210. Generally, if the values of two or more input items are changed, it becomes unclear with which input item the extracted output data change pattern information is related. However, by combining the analysis result 260 obtained by the method of changing only the value of one input item with the analysis result 260 obtained by the method of changing the values of two or more input items, more accurate analysis results 260 can be obtained as compared to the method of changing only the value of one input item. Embodiment 2 indicates this method.

For example, it is judged on the output screen 1500 that the branching processing exists with respect to the screen input item "Product Name," the screen input item "Quantity," the input item Name column which are actually not used for the comparison with the screen input item "ID." Under this circumstance, an input item(s) which is actually used as a branching condition(s) can be found by performing the analysis by changing the values of the two or more input items, Specifically speaking, the analysis is performed by creating input by combining changes each other in a round-robin manner when a change occurs and when no change occurs, with respect to the input item(s) changed between a reference analysis case and a changed analysis case with respect to other input items which may possibly be used for the branching processing.

As a result, it is possible to obtain a set of input items regarding which whether a change exists or not changes if they are changed together. For example, that is a set of input items regarding which a change occurs when the two input items are changed separately, while no change occurs when they are changed together (there is no intention to limit such input items to the set of two input items). This set is the input items used for the comparison in the actual branching processing. Consequently, by combining the analysis results 260 obtained by the method of changing the values of two or more input items, more accurate analysis results 260 can be obtained as compared to the method of changing only the value of one input item.

REFERENCE SIGNS LIST

200: analysis program
210: change analysis case generator
220: output data change information acquisition unit
221: output data initialization unit
222: target program execution unit
223: output data acquisition unit
224: output data change pattern classification unit
230: internal system processing specifying unit
240: analysis result display unit
250: analysis case
251: initial output data
252: input data
260: analysis result
270: executed output data
271: output data change pattern information
272: internal system processing information
280: analysis target system
290: analysis target output data

The invention claimed is:

1. An existing system processing specification extractor for analogizing input items of an existing system and internal system processing patterns, the existing system processing specification extractor comprising:
a processor and a memory, coupled to the processor, storing instructions that when executed by the processor, configure the processor to:
generate different input for a certain input item to the existing system;
detect a change of output data for each of the different input;
compare respective changes of the output data and specifying a difference between the changes; and
associate the input items with processing on the input by using the difference;
classify changes of the output data on the basis of types of the changes of the output data and specify a type of processing based on usage patterns of the input by combining the classifications based the different input,
wherein the existing system processing specification extractor analogizes processing patterns of the processing.

2. The existing system processing specification extractor according to claim 1,
wherein the types of the changes of each pieces of the output data are classified into record addition, deletion, and change by using DB data as the output data.

3. The existing system processing specification extractor according to claim 2,
wherein a change of the DB data is specified, as the change of the output data, by comparing the DB data which is dumped.

4. The existing system processing specification extractor according to claim 2,
wherein a change of the DB data is specified, as the change of the output data, by analyzing a log of SQL executed in association with the input.

5. The existing system processing specification extractor according to claim 2,
wherein a change of the DB data is specified, as the change of the output data, by analyzing a journal log which is output in association with the input.

6. The existing system processing specification extractor according to claim 1, wherein the processor is configured to generate an analysis case of a different input for the input item with respect to an analysis case which serves as a reference.

7. The existing system processing specification extractor according to claim 6,
wherein policy information about selection of an input item to be changed is used for the generation of the analysis case.

8. The existing system processing specification extractor according to claim 6,
wherein restriction information about an input to make a change is used for the generation of the analysis case.

9. The existing system processing specification extractor according to claim 1, wherein the processor is configured to generate an analysis case for which one input among the input items is changed, with respect to an analysis case which serves as a reference.

10. The existing system processing specification extractor according to claim 1, wherein the processor is configured to generate an analysis case for which one input among the input items is changed, and an analysis case for which a plurality of input are changed.

11. The existing system processing specification extractor according to claim 10, wherein the processor is configured to combine and use a plurality of analysis cases for which one input is updated when generating the analysis case for which the plurality of input are changed.

12. The existing system processing specification extractor according to claim 1, wherein the processor is configured to initialize the output data before making input to the existing system.

13. The existing system processing specification extractor according to claim 1, wherein the processor is configured to use a value which an output element has, in order to associate the output elements with each other regarding the initial output data with of executed output data with each other.

14. The existing system processing specification extractor according to claim 1, wherein the processor is configured to use information capable of uniquely identifying an output element in order to associate the same output elements with each other regarding initial output data and executed output data.

15. The existing system processing specification extractor according to claim 1, wherein an SQL log is used in order to associate the same output elements with each other regarding initial output data and executed output data.

16. The existing system processing specification extractor according to claim 1, comprising an output data change pattern classification unit that uses a journal log as a method for associating output elements whose initial output data and executed output data are the same.

17. The existing system processing specification extractor according to claim 1, wherein the processor is configured to display a type of the processing at least based on the input item, the output item, and the usage patterns of the input.

18. The existing system processing specification extractor according to claim 17,
wherein the processor is configured to display classifications based on types of changes of each output element.

19. The existing system processing specification extractor according to claim 17, comprising an analysis result display unit that displays a type of the processing based on at least the input item, the output item, and usage patterns of input item values and analysis cases used for analysis.

20. The existing system processing specification extractor according to claim 19, wherein the processor is configured to group and display the analysis cases with respect to each input for which a change is made.

21. The existing system processing specification extractor according to claim 17, wherein the processor is configured to distinguish and display input items for which no change is made with respect to each of the analysis cases.

22. The existing system processing specification extractor according to claim 17, wherein the processor is configured to specify an input item, regarding which processing with the same input item usage pattern is executed on the same output item, and extract and display an input item which may possibly be used for the same processing as input item for which a change is made to an input value.

23. The existing system processing specification extractor according to claim 17, wherein the processor is configured to specify an input item which causes a difference between the changes of the output data even if values of other input items are the same, and extract and display the input item, which may possibly be used as input of the processing, from a specified reference.

24. The existing system processing specification extractor according to claim 17, wherein the processor is configured to specify an input item with a small number of analysis cases, regarding which values of other input items are the same, and display for recommendation additional analysis by using an analysis case in which a value of an attention-focused input item is changed.

25. The existing system processing specification extractor according to claim 17, wherein the processor is configured to specify and display an input item used for the processing of the existing system, when a plurality of input items are changed, on the basis of a set of input items for which whether a change exists or not changes along with the changes of the plurality of input items, with respect to whether a change exists or not when an individual change is made to each input item.

26. The existing system processing specification extractor according to claim 1, wherein the processor is configured to specify an input item with a small number of analysis cases, whose values of other input items are the same, and generate an analysis case for which an input of the specified input item is changed.

* * * * *